United States Patent
Tanabe et al.

(10) Patent No.: US 10,469,458 B2
(45) Date of Patent: Nov. 5, 2019

(54) E-MAIL SENDING-RECEIVING SYSTEM, CONTROL METHOD THEREFOR, INFORMATION PROCESSING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Koichi Tanabe, Kawasaki (JP); Akihiro Hamana, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 15/457,562

(22) Filed: Mar. 13, 2017

(65) Prior Publication Data

US 2017/0272406 A1 Sep. 21, 2017

(30) Foreign Application Priority Data

Mar. 16, 2016 (JP) ................................. 2016-052247

(51) Int. Cl.
H04L 29/06 (2006.01)
H04L 12/58 (2006.01)

(52) U.S. Cl.
CPC .......... *H04L 63/0428* (2013.01); *H04L 51/08* (2013.01); *H04L 63/061* (2013.01); *H04L 63/083* (2013.01)

(58) Field of Classification Search
CPC ..... H04L 63/0428; H04L 63/06; H04L 51/08; H04L 63/083
See application file for complete search history.

(56) References Cited

U.S. PATENT DOCUMENTS

| | | | | |
|---|---|---|---|---|
| 7,512,791 | B1 * | 3/2009 | Sato | H04L 9/08 380/243 |
| 2005/0289149 | A1 * | 12/2005 | Carro | G06Q 10/107 |
| 2008/0162364 | A1 * | 7/2008 | Martin | G06Q 20/401 705/75 |
| 2015/0052355 | A1 * | 2/2015 | Munshi | H04L 63/0428 713/168 |

FOREIGN PATENT DOCUMENTS

JP 2015-122097 A 7/2015

* cited by examiner

*Primary Examiner* — Meng Li
(74) *Attorney, Agent, or Firm* — Cowan, Liebowitz & Latman, P.C.

(57) ABSTRACT

An e-mail sending-receiving system that enables to ensure security at the time of sending and receiving an e-mail including an attached file encrypted and to improve convenience. In an e-mail sending terminal, a first storing unit stores a password in a storage medium in association with a receiving-side mail address, an encryption unit encrypts a file attached to an e-mail so as to be decodable using the password, a generation unit generates the e-mail by attaching the file encrypted, and a sending unit sends the e-mail to the receiving-side mail address. In an e-mail receiving-side terminal, a second storing unit stores the password in the storage medium in association with a sending-side mail address, a reception unit receives the e-mail, and a decoding unit decodes the encrypted file using the password stored in association with the sending-side mail address of the e-mail received.

7 Claims, 9 Drawing Sheets

FIG. 2A

```
PREPARE NEW MAIL   TRANSFER   SAVE ATTACHED FILE

TITLE                    SENDER          SENDING TIME & DATE
I am very grateful to you   def@aaa.co.jp   2015/09/03 10:34:50
About 9/20 conference       ghi@bbb.com     2015/09/01 17:10:10
About sending of schedule   jkl@ccc.co.jp   2015/08/20 07:05:43

Mr. OO

Please accept the material for 9/20 conference in advance.

📄 Conference_material.zip
```

- 200 (window)
- 201 PREPARE NEW MAIL
- 202 TRANSFER
- 206 SAVE ATTACHED FILE
- 203 (mail list)
- 204 (body)
- 205 (attachment)

FIG. 2B

```
SEND   ATTACH FILE

DESTINATION  abc@xyz.com
TITLE        Sending of meeting minutes

Mr. xx

Please accept the meeting minutes
of the conference yesterday.
Please confirm.

📄 Meeting_minutes.txt
```

- 250 (window)
- 251 SEND
- 252 ATTACH FILE
- 253 DESTINATION
- 254 TITLE
- 255 (body)
- 256 (attachment)

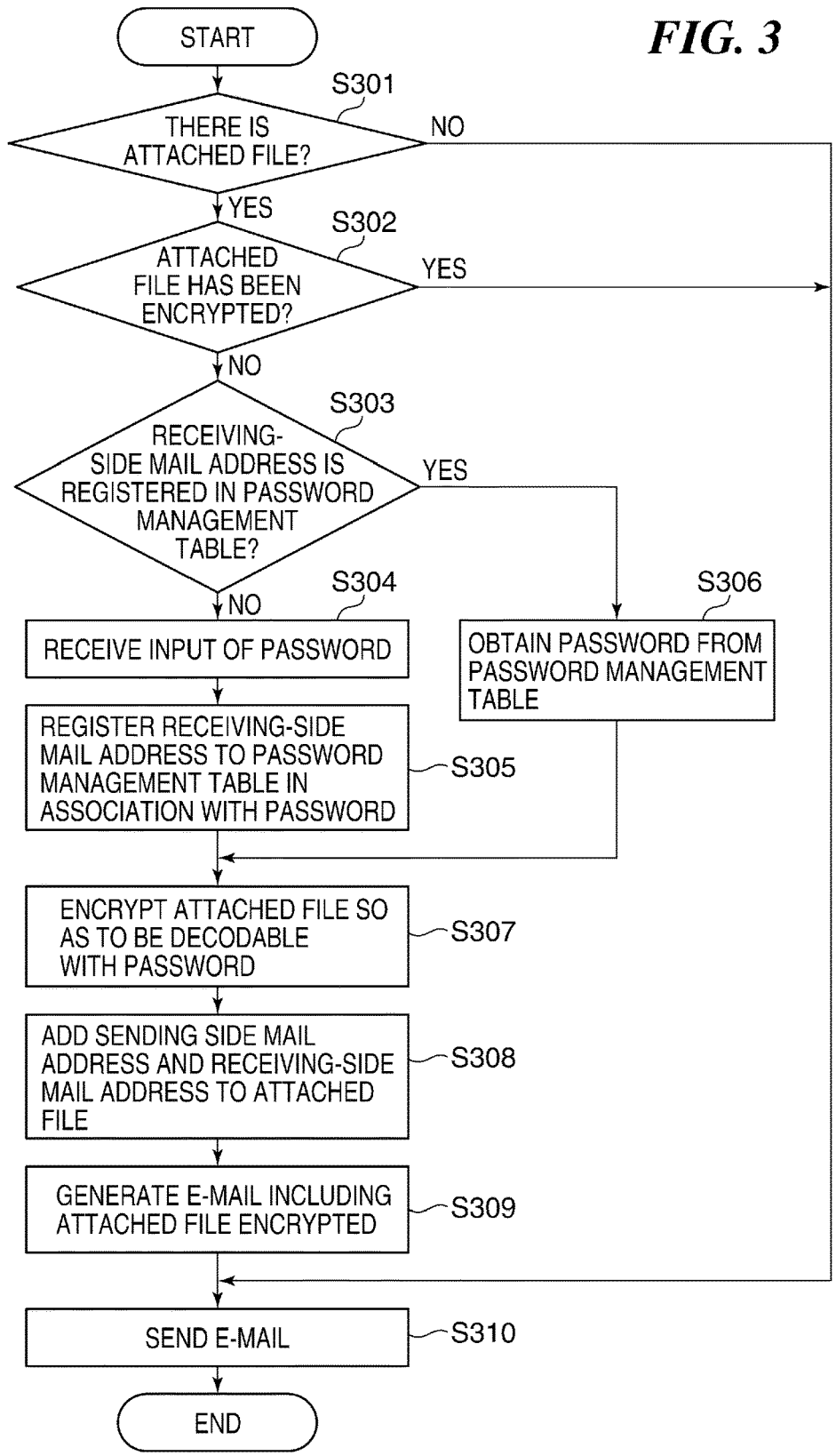

FIG. 4A

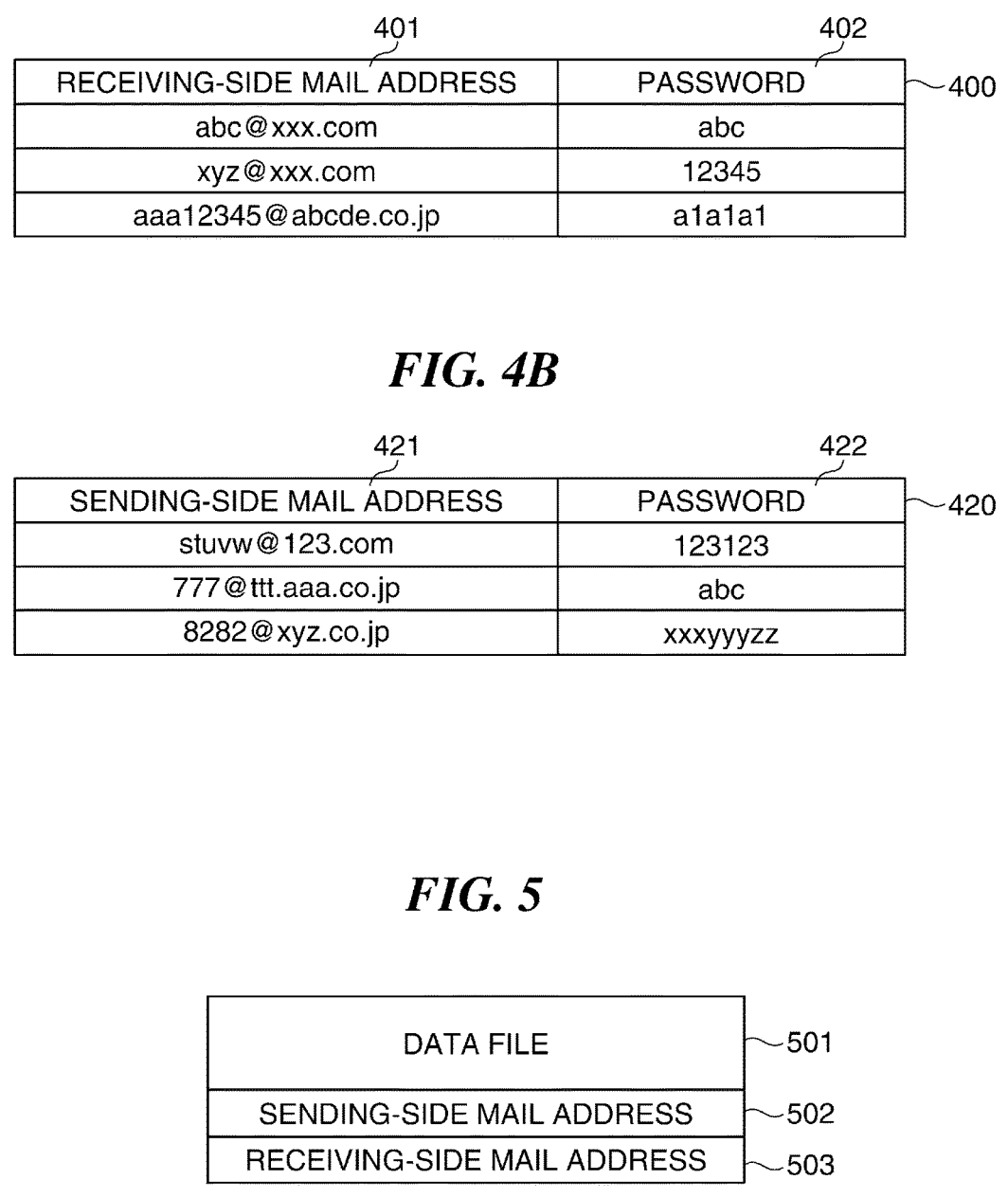

| RECEIVING-SIDE MAIL ADDRESS | PASSWORD |
|---|---|
| abc@xxx.com | abc |
| xyz@xxx.com | 12345 |
| aaa12345@abcde.co.jp | a1a1a1 |

FIG. 4B

| SENDING-SIDE MAIL ADDRESS | PASSWORD |
|---|---|
| stuvw@123.com | 123123 |
| 777@ttt.aaa.co.jp | abc |
| 8282@xyz.co.jp | xxxyyyzz |

FIG. 5

| |
|---|
| DATA FILE |
| SENDING-SIDE MAIL ADDRESS |
| RECEIVING-SIDE MAIL ADDRESS |

E-MAIL SENDING-RECEIVING SYSTEM, CONTROL METHOD THEREFOR, INFORMATION PROCESSING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an e-mail sending-receiving system, a control method therefor, an information processing apparatus, a control method therefor, and a storage medium storing control program therefor, and particularly relates to a technique for sending and receiving an e-mail including an attached file encrypted.

Description of the Related Art

When an E-mail including an attached file is sent, a password is set to the attached file for a purpose of ensuring security in many cases (see Japanese Laid-Open Patent Publication (Kokai) No. 2015-122097 (JP 2015-122097A)). In this case, the ZIP file format that allows compression of an attached file to reduce file size and enables to set a password is widely used from a viewpoint of ensuring security.

However, a user may forget encryption of an attached file when sending an e-mail or a user may not encrypt an attached file intentionally because an encryption operation is troublesome. In order to avoid a security risk at the time when an e-mail including an attached file that is not encrypted is sent, the above-mentioned publication has proposed a method that a mail server automatically sets a password and encrypts the attached file that was not encrypted.

However, since the method described in the above-mentioned publication aims to ensure the security at the time of sending of an e-mail including an attached file, a receiver of the e-mail needs to input the password for decoding the attached file, which requires labor. Moreover, since the decoded attached file is in a state where no password is set, there is a problem that the security is not ensured.

SUMMARY OF THE INVENTION

The present invention provides a technique that enables to ensure security at the time of sending and receiving an e-mail including an attached file encrypted and to improve convenience.

Accordingly, a first aspect of the present invention provides an e-mail sending-receiving system including an e-mail sending-side terminal and e-mail receiving-side terminal. The e-mail sending terminal includes a first storing unit configured to store a password in a storage medium in association with a receiving-side mail address, an encryption unit configured to encrypt a file attached to an e-mail so as to be decodable using the password that is stored in association with the receiving-side mail address of the e-mail, a generation unit configured to generate the e-mail by attaching the file encrypted by the encryption unit, and a sending unit configured to send the e-mail generated by the generation unit to the receiving-side mail address. The e-mail receiving-side terminal includes a second storing unit configured to store the password in the storage medium in association with a sending-side mail address, a reception unit configured to receive the e-mail sent by the sending unit, and a decoding unit configured to decode the encrypted file using the password stored in association with the sending-side mail address of the e-mail received by the reception unit.

Accordingly, a second aspect of the present invention provides an information processing apparatus including a storing unit configured to store a password in a storage medium in association with a receiving-side mail address, an encryption unit configured to encrypt a file attached to an e-mail so as to be decodable using the password that is stored in association with the receiving-side mail address of the e-mail, a generation unit configured to generate the e-mail by attaching the file encrypted by the encryption unit, and a sending unit configured to send the e-mail generated by the generation unit to the receiving-side mail address. The password is stored in association with a sending-side mail address of the e-mail by another information processing apparatus that receives the e-mail sent by the sending unit.

Accordingly, a third aspect of the present invention provides an information processing apparatus including a first storing unit configured to store a first password in a storage medium in association with a sending-side mail address, a reception unit configured to receive an e-mail to which an encrypted file is attached, and a decoding unit configured to decode the encrypted file using the first password stored in association with the sending-side mail address of the e-mail received by the reception unit. The first password is stored in association with a receiving-side mail address of the e-mail by another information processing apparatus that sends the e-mail received by the reception unit. The encrypted file is encrypted by the other information processing apparatus so as to be decodable using the first password.

Accordingly, a fourth aspect of the present invention provides a control method for an e-mail sending-receiving system, the control method including a step of storing a password in a storage medium in association with a receiving-side mail address, a step of storing the password in the storage medium in association with a sending-side mail address, a step of encrypting a file attached to an e-mail so as to be decodable using the password that is stored in association with the receiving-side mail address of the e-mail, a step of generating the e-mail by attaching the encrypted file, a step of sending the generated e-mail to the receiving-side mail address, a step of receiving the sent e-mail, and a step of decoding the encrypted file using the password stored in association with the sending-side mail address of the received e-mail.

Accordingly, a fifth aspect of the present invention provides a control method for an information processing apparatus, the control method includes a storing step of storing a password in a storage medium in association with a receiving-side mail address, an encryption step of encrypting a file attached to an e-mail so as to be decodable using the password that is stored in association with the receiving-side mail address of the e-mail, a generation step of generating the e-mail by attaching the encrypted file, and a sending step of sending the generated e-mail to the receiving-side mail address. The password is stored in association with a sending-side mail address of the e-mail by another information processing apparatus that receives the sent e-mail.

Accordingly, a sixth aspect of the present invention provides a control method for an information processing apparatus, the control method including a storing step of storing a first password in a storage medium in association with a sending-side mail address, a reception step of receiving an e-mail to which an encrypted file is attached, and a decoding step of decoding the encrypted file using the first password that is stored in association with the sending-side mail address of the received e-mail. The first password is stored in association with a receiving-side mail address of the e-mail by another information processing apparatus that sends the e-mail received. The encrypted file is encrypted by the other information processing apparatus so as to be decodable using the first password.

Accordingly, a seventh aspect of the present invention provides a non-transitory computer-readable storage medium storing a control program causing a computer to execute a control method for an image processing apparatus, the control method including a storing step of storing a password for encrypting a file attached to an e-mail in a storage medium in association with a receiving-side mail address of the e-mail, an obtaining step of obtaining the password that is stored in association with the receiving-side mail address from the storage medium, an encryption step of encrypting the attached file using the password obtained in the obtaining step, and a sending step of sending the e-mail including the attached file encrypted in the encryption step to the receiving-side mail address.

Accordingly, an eighth aspect of the present invention provides a non-transitory computer-readable storage medium storing a control program causing a computer to execute the control method of the fifth aspect.

Accordingly, a ninth aspect of the present invention provides a non-transitory computer-readable storage medium storing a control program causing a computer to execute the control method of the sixth aspect.

According to the present invention, the security at the time of sending and receiving an e-mail including an attached file encrypted is ensured and the convenience is improved.

Further features of the present invention will become apparent from the following description of exemplary embodiments with reference to the attached drawings.

BRIEF DESCRIPTION OF THE DRAWINGS

FIG. 2A and FIG. 2B are views respectively showing an example of a main screen and an example of a mail creation screen that are displayed when an e-mail application starts in the information processing apparatus shown in FIG. 1B.

FIG. 3 is a flowchart showing an e-mail sending process executed by the information processing apparatus shown in FIG. 1B.

FIG. 4A and FIG. 4B are views showing examples of password management tables used when the information processing apparatus shown in FIG. 1B operates as an e-mail sending terminal and an e-mail receiving terminal, respectively.

FIG. 5 is a view describing an example of a data configuration of a file end of an attached file encrypted that is generated in step S307 in FIG. 3.

DESCRIPTION OF THE EMBODIMENTS

Hereafter, embodiments according to the present invention will be described in detail with reference to the drawings.

Figure 1A:
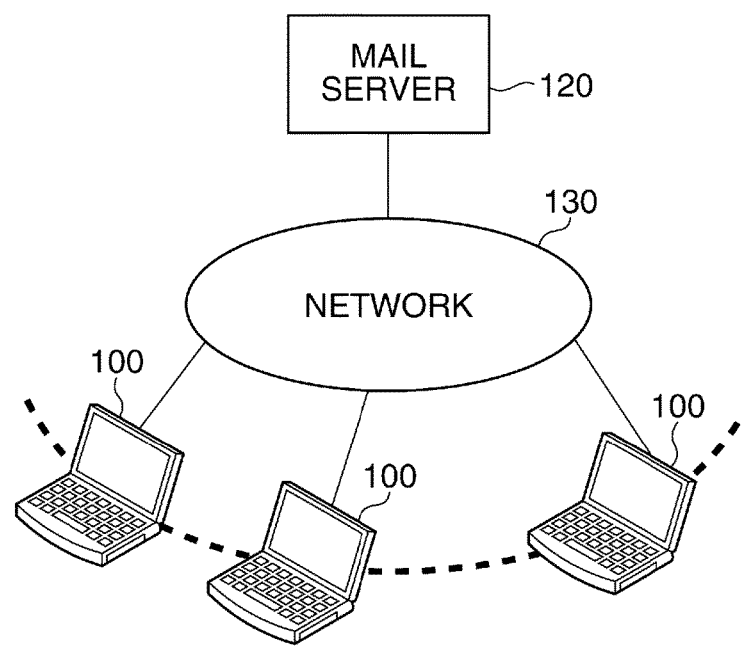
FIG. 1A is a view schematically showing a configuration of an e-mail sending-receiving system according to an embodiment of the present invention.

FIG. 1A is a view schematically showing a configuration of an e-mail sending-receiving system according to the embodiment of the present invention. The e-mail sending-receiving system is constituted by connecting a mail server 120 and a plurality of information processing apparatuses (FIG. 1A shows three information processing apparatuses 100) through a network 130.

Specifically, the network 130 is the Internet and/or a LAN. Each of the information processing apparatuses 100 is a terminal that allows an operation of an e-mail application for exclusive use for sending and receiving an e-mail and that communicates with the mail servers 120 by the protocol that enables sending and reception of an e-mail through the network 130. The sending and reception system of an e-mail may be a push type or a pull type. Specifically, the information processing apparatuses 100 are personal computers (desktops, laptops, tablets, etc.), smart phones, etc.

Figure 1B:
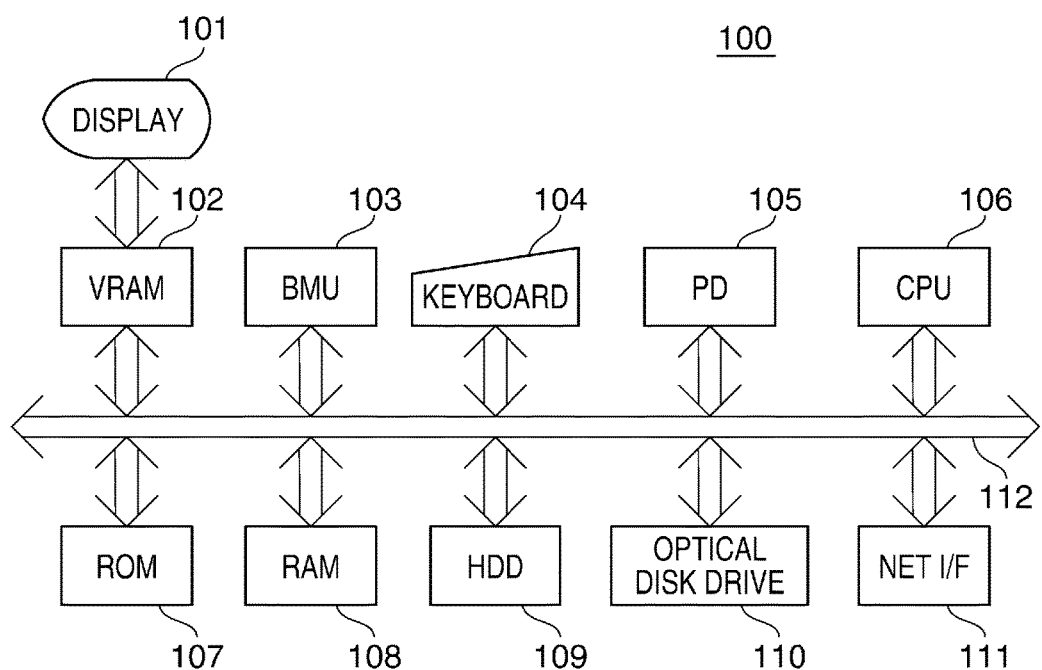
FIG. 1B is a block diagram schematically showing a configuration of an information processing apparatus constituting the e-mail sending-receiving system.

Next, a hardware configuration of the information processing apparatus 100 will be described as follows. It should be noted that the information processing apparatuses 100 just have an equivalent function for sending and receiving an e-mail, and the hardware configurations may differ. FIG. 1B is a block diagram schematically showing a configuration of the information processing apparatus 100. The information processing apparatus 100 is provided with a display unit 101, a VRAM 102, a BMU (Bit Move Unit) 103, a keyboard 104, a PD (Pointing Device) 105, a CPU 106, a ROM 107, a RAM 108, an HDD 109, an optical disk drive 110, a network I/F 111, and a bus 112.

The display unit 101 is an LCD, for example, that displays various kinds of information including a user interface for an OS and an application (software) that run on the information processing apparatus 100. The VRAM 102 stores data for displaying various kinds of information on the display unit 101. The data stored in the VRAM 102 is transferred to the display unit 101 according to a predetermined regulation, and the various kinds of information are displayed on the display unit 101 as an icon, a menu, an object, etc.

The BMU 103 controls the data transfer between memories (for example, between the VRAM 102 and the RAM 108) and the data transfer between a memory and an I/O device (for example, between the RAM 108 and the network I/F 111). The keyboard 104 is one of input units that have various keys for inputting a character, a number, etc. The PD 105 is an input unit, such as a mouse and a touch panel, used for designating an icon, a menu, and another content displayed on the display unit 101.

The ROM 107 is a storage medium that stores control programs, such as a BIOS required for starting the information processing apparatus 100, and data. The RAM 108 is a storage medium that has a work area of the CPU 106, a primary storage area in which various data is stored temporarily, a load area for various programs, etc. The HDD 109 is a storage medium that stores an OS program, various kinds of control programs, programs of the various applications (software) that run on the OS program, various data, etc. The optical disk drive 110 is able to read a program etc. that are stored in an optical disk, such as a DVD-RAM.

The CPU 106 totally controls the various hardware components (blocks) that constitute the information processing apparatus 100 by running the various kinds of control programs stored in the ROM 107. Moreover, the CPU 106 performs various kinds of processes according to the OS program and the application program by developing the programs stored in the HDD 109 etc. to the RAM 108. The CPU 106 sends and receives an e-mail through the network 130 and the mail server 120 by executing a dedicated e-mail application for sending and receiving an e-mail.

The network I/F 111 enables communication between the CPU 106 and the mail server 120 through the network 130. Another information processing apparatus may supply the control program to the CPU 106 via the network through the network I/F 111. The bus 112 includes an address bus, a data bus, and a control bus, and enables data communication between the blocks constituting the information processing apparatus 100. The information processing apparatus 100 has a port to which an external apparatus, such as a USB device, is connected, an interface that enables data communication between an external apparatus equipped and the CPU 106, etc. (not shown).

Next, a control process with the information processing apparatus 100 at the time of sending an e-mail to a predetermined mail address from the information processing apparatus 100 will be described. In the following description, the information processing apparatus 100 used as a sending apparatus that sends an e-mail including an attached file is referred to as "the information processing apparatus 100S", for convenience.

FIG. 2A is a view showing an example of a main screen 200 displayed on the display unit 101 of the information processing apparatus 100S. The main screen 200 is displayed on the display unit 101, when the CPU 106 executes the dedicated e-mail application for sending and receiving an e-mail. The main screen 200 includes a new mail preparation button 201, transfer button 202, mail information display column 203, mail text display column 204, the attached file display column 205, and save button 206. The new mail preparation button 201 is used to start preparation of a new e-mail. When the new mail preparation button 201 is pressed, a mail preparation screen 250 (see FIG. 2B) mentioned later is displayed on the display unit 101. The transfer button 202 is used to transfer the e-mail selected in the mail information display column 203 to a third party. When the transfer button 202 is pressed, the mail preparation screen 250 is displayed.

A list of received mails is displayed in the mail information display column 203. The body of the e-mail selected in the mail information display column 203 is displayed in the mail body display column 204. When the e-mail selected in the mail information display column 203 includes an attached file, the attached file is displayed in the attached file display column 205 as an icon etc. The save button 206 is used to save the attached file currently displayed in the attached file display column 205 to the HDD 109 etc. When the save button 206 is pressed, a file saving screen 600 (see FIG. 6) mentioned later is be displayed. It should be noted that the save button 206 may not be displayed when an e-mail that does not include an attached file is selected in the mail information display column 203. The file saving screen 600 will be mentioned later.

FIG. 2B is a view showing an example of the mail preparation screen 250. The mail preparation screen 250 is displayed on the display unit 101 when the new mail preparation button 201 or the transfer button 202 is pressed. The mail preparation screen 250 includes a sending button 251, a file attaching button 252, a destination input column 253, a title input column 254, a body input column 255, and an attached file display column 256. The sending button 251 is used to send a prepared e-mail to a mail address that is input into the destination input column 253. The file attaching button 252 is used to attach a file to an e-mail in preparation. When the file attaching button 252 is pressed, a file selection screen (not shown) is displayed. A screen that is beforehand prepared by an OS that works the information processing apparatus 100S is used as the file selection screen, for example. Since such a method is well known, a detailed description is omitted. A file may be attached by a well-known method so as to drag and drop the file to be attached from a predetermined directory in the OS onto the mail preparation screen 250.

The destination input column 253 is an area for designating a receiving-side mail address of an e-mail. The title input column 254 is an area for inputting a title of an e-mail. The body input column 255 is an area for inputting a body of an e-mail. The attached file display column 256 is an area for displaying a selected attached file. Although the attached file display column 256 is displayed when there is an attached file, it is not displayed when there is no attached file.

FIG. 3 is a flowchart showing an e-mail sending process executed by the information processing apparatus 100S. Each process shown in FIG. 3 is achieved when the CPU 106 develops an e-mail application (program) to the RAM 208, executes a predetermined arithmetic process according to the program, and controls the blocks constituting the information processing apparatus 100S.

In step S301, the CPU 106 checks whether there is an attached file in an e-mail (an e-mail that will be sent) in preparation in the mail preparation screen 250. When starting the mail preparation process, the CPU 106 detects whether an instruction to attach a file to the e-mail in preparation has been input. When detecting no instruction to attach a file (NO in the step S301), the CPU 106 proceeds with the process to step S310. When detecting an instruction to attach a file (YES in the step S301), the CPU 106 proceeds with the process to step S302. In the step S302, the CPU 106 checks whether the attached file has been encrypted. When the attached file has been encrypted (YES in the step S302), the CPU 106 proceeds with the process to the step S310. When the attached file has not been encrypted (NO in the step S1004), the CPU 106 proceeds with the process to step S303. In the step S303, the CPU 106 checks whether the receiving-side mail address of the e-mail is registered in a password management table.

The password management table will be described as follows. FIG. 4A is a view showing an example of the password management table 400 used when the information processing apparatus 100S operates as a sending apparatus of an e-mail. The password management table 400 is stored in the HDD 109, for example. The password management table 400 consists of a receiving-side mail address column 401 and a password column 402. A mail address registered as a destination (a receiving side) of an e-mail is stored in the receiving-side mail address column 401. One password is registered in the password column 402 for each mail address registered in the receiving-side mail address column 401. Thus, the password management table 400 manages by associating one password to one receiving-side mail address. It should be noted that the password management table 420 in FIG. 4B is used when the information processing apparatus 100 operates as a receiving apparatus of an e-mail, and the detail will be mentioned later. In this embodiment, the information processing apparatus 100 has both of the password management tables 400 and 420.

The description returns to FIG. 3. When the receiving-side mail address is not registered in the password management table 400 (NO in the step S303), the CPU 106 proceeds with the process to step S304. In the step S304, the CPU 106 displays a password input screen (not shown) and receives an input of a password used to encrypt an attached file. The password input screen includes a message "Please input a password", a password input column, an OK button, a cancel button, etc., for example. When the input of the password has been received (when the password is input into the password input column and the OK button is pressed), the CPU 106 closes the password input screen. In the following step S305, the CPU 106 registers the receiving-side mail address to the password management table 400 in association with the password input in the step S304. The CPU 106 proceeds with the process to step S307 after executing the process in the step S305.

On the other hand, when the receiving-side mail address is registered in the password management table 400 (YES in the step S303), the CPU 106 proceeds with the process to step S306. In the step S306, the CPU 106 obtains the password associated with the receiving-side mail address from the password management table 400. For example, when the receiving-side mail address is "abc@xxx.com", the password "abc" is obtained from the password management table 400. The CPU 106 proceeds with the process to the step S307 after executing the process in the step S306.

In the step S307, the CPU 106 encrypts the attached file with using the password input in the step S304 or the password obtained from the password management table 400 in the step S306. The attached file is encrypted so as to be decodable with the obtained password. When a plurality of receiving-side mail addresses are set up, a plurality of passwords are obtained in the step S304 or S306 for the respective receiving-side mail addresses, and a plurality of attached files that are encrypted with the obtained passwords are generated. For example, when the receiving-side mail addresses are "abc@xxx.com" and "xyz@xxx.com", the attached files that are encrypted with the respective passwords "abc" and "12345" are generated.

In step S308, the CPU 106 adds the sending-side mail address and the respective receiving-side mail addresses to the respective attached files that were encrypted in the step S307. FIG. 5 is a view describing an example of a data configuration of a file end of an attached file encrypted that is generated in the step S307. A data file 501 is a data part of an attached file encrypted. A sending-side mail address 502 is added to the data file 501. A receiving-side mail address 503 is added to the data file 501 following the sending-side mail address 502. The order of the sending-side mail address 502 and the receiving-side mail address 503 added to the data file 501 may be reverse. Moreover, the sending-side mail address and the receiving-side mail address may be stored and managed in a file other than the attached file in association with the attached file instead of adding the addresses to the attached file.

In step S309, the CPU 106 generates an e-mail by attaching the attached file that was encrypted in the step S307 and to which the mail addresses were given in the step S308. When a plurality of receiving-side mail addresses are set up, the CPU 106 generates e-mails for the respective receiving-side mail addresses by attaching the respective files that were encrypted so as to be decodable with the passwords associated with the respective receiving-side mail addresses and to which the sending side address and the respective receiving-side mail addresses were added. Thus, the e-mail including the attached file encrypted so as to be decoded with the password associated with the receiving-side mail address is generated for each of the receiving-side mail addresses. In step S310, the CPU 106 sends the e-mail including the attached file generated in the step S309 to the destination (addressing to the receiving-side mail address) that is input in the destination input column 253. Accordingly, the e-mail sending process by the information processing apparatus 100S is finished.

As mentioned above, the information processing apparatus used as the sending-side terminal of an e-mail including an attached file manages a password for every receiving-side mail address according to the process of the flowchart in FIG. 3. Accordingly, when the receiving-side mail address is a mail address registered in the password management table 400, an attached file is encrypted and sent without inputting a password whenever an e-mail including an attached file is sent.

Next, a control process to save the attached file when the information processing apparatus 100 receives the e-mail sent in the step S310 in FIG. 3 will be described. In the following description, the information processing apparatus 100 used as a receiving apparatus that receives an e-mail including an attached file is referred to as "the information processing apparatus 100R", for convenience.

Figure 6:
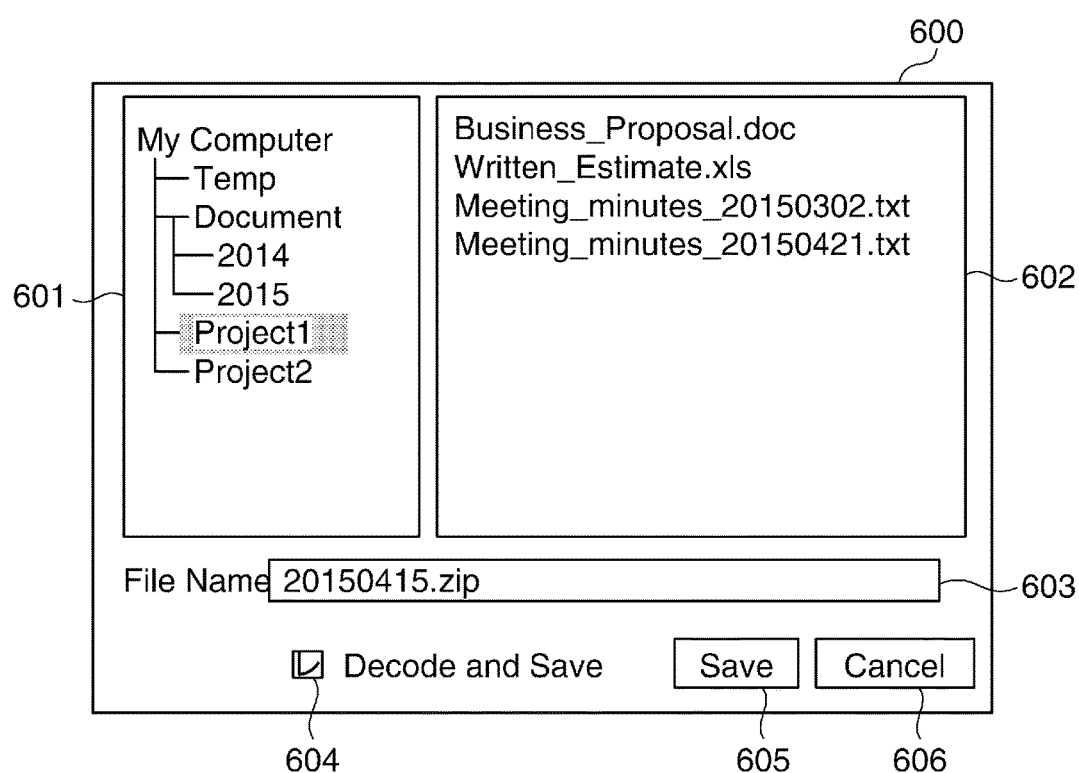
FIG. 6 is a view showing an example of a file saving screen displayed on a display unit of the information processing apparatus shown in FIG. 1B when a save button is pressed in the main screen in FIG. 2A.

The information processing apparatus 100R displays the main screen 200 shown in FIG. 2A on the display unit 101 by starting the e-mail application. FIG. 6 is a view showing an example of the file saving screen 600 displayed on the display unit 101 when the save button 206 on the main screen 200 in FIG. 2A is pressed. The file saving screen 600 includes a directory display column 601, file list display column 602, file name input field 603, check box 604, save button 605, and cancel button 606.

The directory display column 601 is an area where a list of the directories on the OS of the information processing apparatus 100R is displayed, and is used to select a directory where an attached file is saved. A list of file names of files saved in the directory ("Project1" in FIG. 6) that is selected in the directory display column 601 is displayed in the file list display column 602. The file name input field 603 is an area for inputting a name (a file name) that is used when an attached file displayed in the attached file display column 205 of the main screen 200 is saved.

The check box 604 is provided to receive an instruction to decode and save an encrypted attached file. When decoding and saving an attached file, a user needs to check the check box 604. When an attached file is not encrypted, the check box 604 may not be displayed. When saving an attached file with a file name input into the file name input field 603, the user presses the save button 605. The file saving screen 600 is closed after saving the attached file. Details of an attached-file storage process that is executed when the save button 605 is pressed will be mentioned later. When finishing the operation without saving an attached file, the user presses the cancel button 606. When the cancel button 606 is pressed, the contents operated in the file saving screen 600 are canceled, and the file saving screen 600 is closed.

Figure 7:
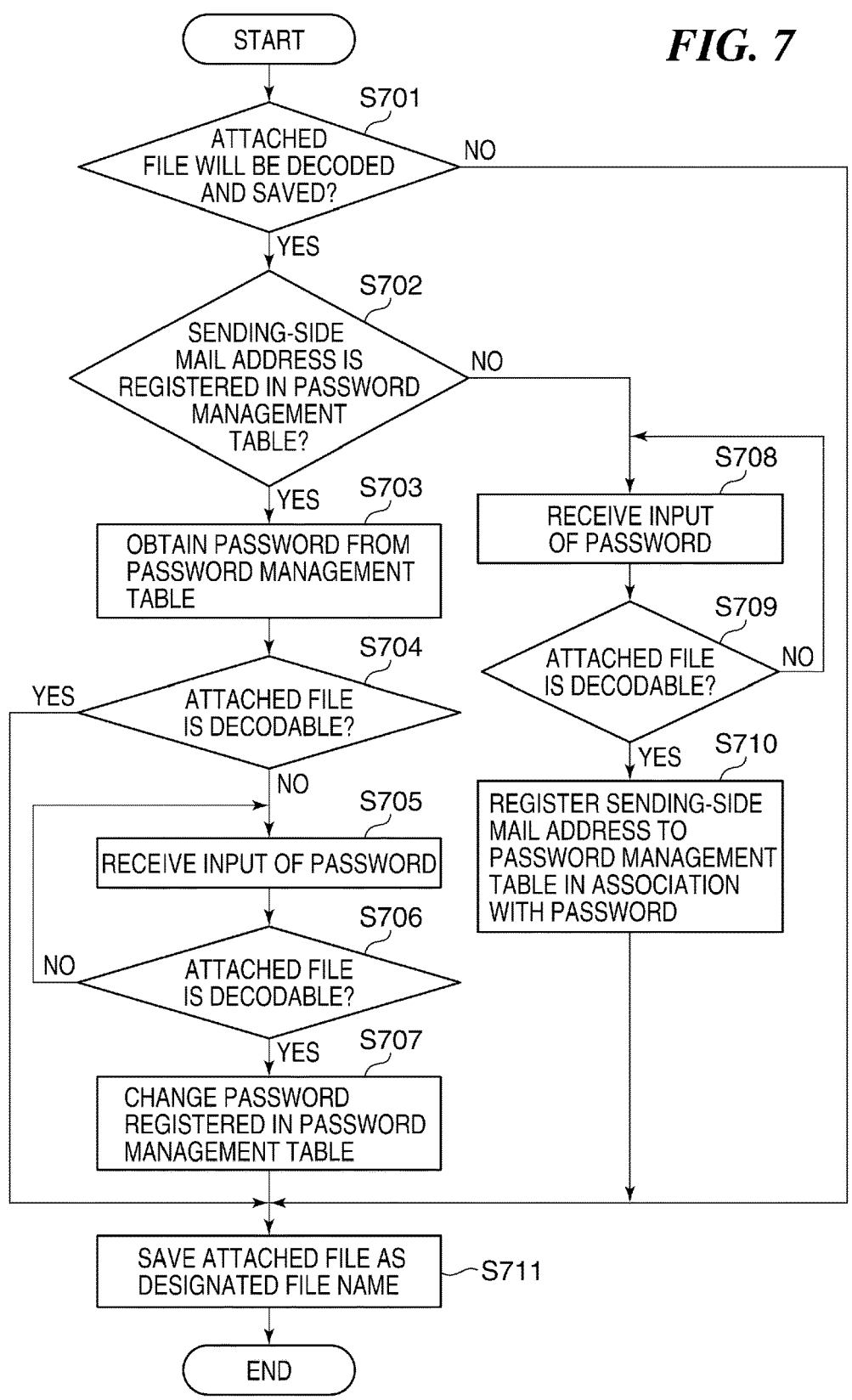
FIG. 7 is a flowchart showing an attached-file storage process executed by the information processing apparatus shown in FIG. 1B when a save button is pressed in the file saving screen in FIG. 6.

FIG. 7 is a flowchart showing an attached-file storage process executed by the information processing apparatus 100R when the save button 605 in the file saving screen 600 is pressed. Each process shown in FIG. 7 is achieved when the CPU 106 develops the e-mail application (program) to the RAM 208, executes a predetermined arithmetic process according to the program, and controls the blocks constituting the information processing apparatus 100R.

In step S701, the CPU 106 checks whether an attached file will be decoded and saved (whether the check box 604 is checked). When the attached file will be decoded and saved (YES in the step S701), the CPU 106 proceeds with the process to step S702. When the attached file will not be decoded and saved (NO in the step S701), the CPU 106 proceeds with the process to step S711. In the step S702, the CPU 106 checks whether the sending-side mail address of the e-mail including the attached file that is subjected to save is registered in the password management table 420 of the information processing apparatus 100R.

FIG. 4B is a view showing an example of the password management table 420 used when the information processing apparatus 100R operates as an e-mail receiving-side terminal. The password management table 420 is stored in the HDD 109, for example. The password management table 420 consists of a sending-side mail address column 421 and a password column 422. A mail address registered as an e-mail sending-side terminal is stored in the sending-side mail address column 421. One password is registered in the password column 422 for each mail address registered in the sending-side mail address column 421. Thus, the password management table 420 manages by associating one password to one mail address as with the password management table 400.

When the sending-side mail address is registered in the password management table 420 (YES in the step S702), the CPU 106 proceeds with the process to step S703. On the other hand, when the sending-side mail address is not registered in the password management table 420 (NO in the step S702), the CPU 106 proceeds with the process to step S708.

In the step S703, the CPU 106 obtains the password associated with the sending-side mail address from the password management table 420. In step S704, the CPU 106 determines whether the attached file is decodable with the password obtained in the step S703. When the attached file is decodable (YES in the step S704), the CPU 106 proceeds with the process to step S711. For example, it is assumed that the mail address "abc@xxx.com" is set in the e-mail application of the information processing apparatus 100R as the e-mail receiving-side terminal. Moreover, it is assumed that the mail address "777@ttt.aaa.co.jp" is set in the e-mail application of the information processing apparatus 100S as the e-mail sending-side terminal. In this case, when the information processing apparatus 100S sends an attached file to the information processing apparatus 100R, the attached file is encrypted so as to be decoded with the password "abc" and the password "abc" is set according to the password management table 400 in FIG. 4A. Then, the information processing apparatus 100R obtains the password "abc" associated with the mail address "777@ttt.aaa.co.jp" set in the e-mail application of the information processing apparatus 100S according to the password management table 420 in FIG. 4B. In this case, since the password set to the attached file is coincident with the password that the information processing apparatus 100R uses to decode the attached file, the information processing apparatus 100R is able to decode the attached file. Accordingly, the determination in the step S704 becomes "YES".

On the other hand, when the attached file is not decodable (NO in the step S704), the CPU 106 proceeds with the process to step S705. For example, it is assumed that the mail address "xyz@xxx.com" is set in the e-mail application of the information processing apparatus 100R as the e-mail receiving-side terminal. Moreover, it is assumed that the mail address "777@ttt.aaa.co.jp" is set in the e-mail application of the information processing apparatus 100S as the e-mail sending-side terminal. In this case, when the information processing apparatus 100S sends an attached file to the information processing apparatus 100R, the attached file is encrypted so as to be decoded with the password "12345" and the password "12345" is set according to the password management table 400 in FIG. 4A. Then, the information processing apparatus 100R obtains the password "abc" associated with the mail address "777@ttt.aaa.co.jp" set in the e-mail application of the information processing apparatus 100S according to the password management table 420 in FIG. 4B. In this case, since the password set to the attached file is not coincident with the password that the information processing apparatus 100R uses to decode the attached file, the information processing apparatus 100R cannot decode the attached file. Accordingly, the determination in the step S704 becomes "NO". For example, such a situation may arise when the contents of the password management table 400 or 420 can be edited independently from the sending and reception of an e-mail.

In the step S705, the CPU 106 displays a password input screen (not shown) and receives an input of a password to decode the attached file. It should be noted that the password input screen is the same as the password input screen described on the occasion of the description about the step S304 of the flowchart in FIG. 3. Moreover, a user of the information processing apparatus 100R needs to obtain the password that is input in the step S705 from the user of the information processing apparatus 100S by a separate e-mail, a telephone, or the like. In step S706, the CPU 106 determines whether the attached file is decodable with the password input in the step S705. When the attached file is decodable (YES in the step S706), the CPU 106 proceeds with the process to the step S707. When the attached file is not decodable (NO in the step S706), the CPU 106 returns the process to the step S705. In the step S707, the CPU 106 updates the password management table 420 by changing the registered password associated with the sending-side mail address to the password that was input in the step S705. The CPU 106 proceeds with the process to the step S711 after executing the process in the step S707.

In the step S708, the CPU 106 displays a password input screen (not shown) and receives an input of a password to decode the attached file. It should be noted that the password input screen is the same as the password input screen described on the occasion of the description about the step S304 of the flowchart in FIG. 3. Moreover, the user of the information processing apparatus 100R needs to obtain the password that is input in the step S708 from the user of the information processing apparatus 100S by a separate e-mail, a telephone, or the like. In step S709, the CPU 106 determines whether the attached file is decodable with the password input in the step S708. When the attached file is decodable (YES in the step S709), the CPU 106 proceeds with the process to the step S710. When the attached file is not decodable (NO in the step S709), the CPU 106 returns the process to the step S708. In the step S710, the CPU 106 registers the sending-side mail address that was obtained in the step S702 in association with the password input in the step S708 to the password management table 420. The CPU 106 proceeds with the process to the step S711 after executing the process in the step S710.

In the step S711, the CPU 106 decodes the attached file with the password specified in the step S703, S705, or S708, and saves the attached file decoded in a predetermined directory with the file name input into the file name input field 603.

When the determination in the step S701 becomes "NO" and the process proceeds to the step S711, no sending-side mail address and no receiving-side mail address may be given to an attached file. Accordingly, the CPU 106 checks whether a sending-side mail address and a receiving-side mail address are given to an attached file. When no sending-side mail address and no receiving-side mail address are given to the attached file, the CPU 106 obtains a sending-side mail address and a receiving-side mail address from a received e-mail. Then, the CPU 106 adds the sending-side mail address and receiving-side mail address that were obtained to the end of the attached file to be saved so that the data configuration of the attached file becomes similar to the data configuration described with reference to FIG. 5. Accordingly, the attached file becomes decodable in a process in FIG. 8 described below. The step S711 is the last step of this process.

As mentioned above, the information processing apparatus used as the receiving-side terminal of an e-mail including an attached file manages a password for every receiving-side mail address according to the process of the flowchart in FIG. 7. Accordingly, when a sending-side mail address of an e-mail including an attached file is registered in the password management table 420, an attached file is decoded and saved even if a password is not input every time when an attached file encrypted is received.

Figure 8:
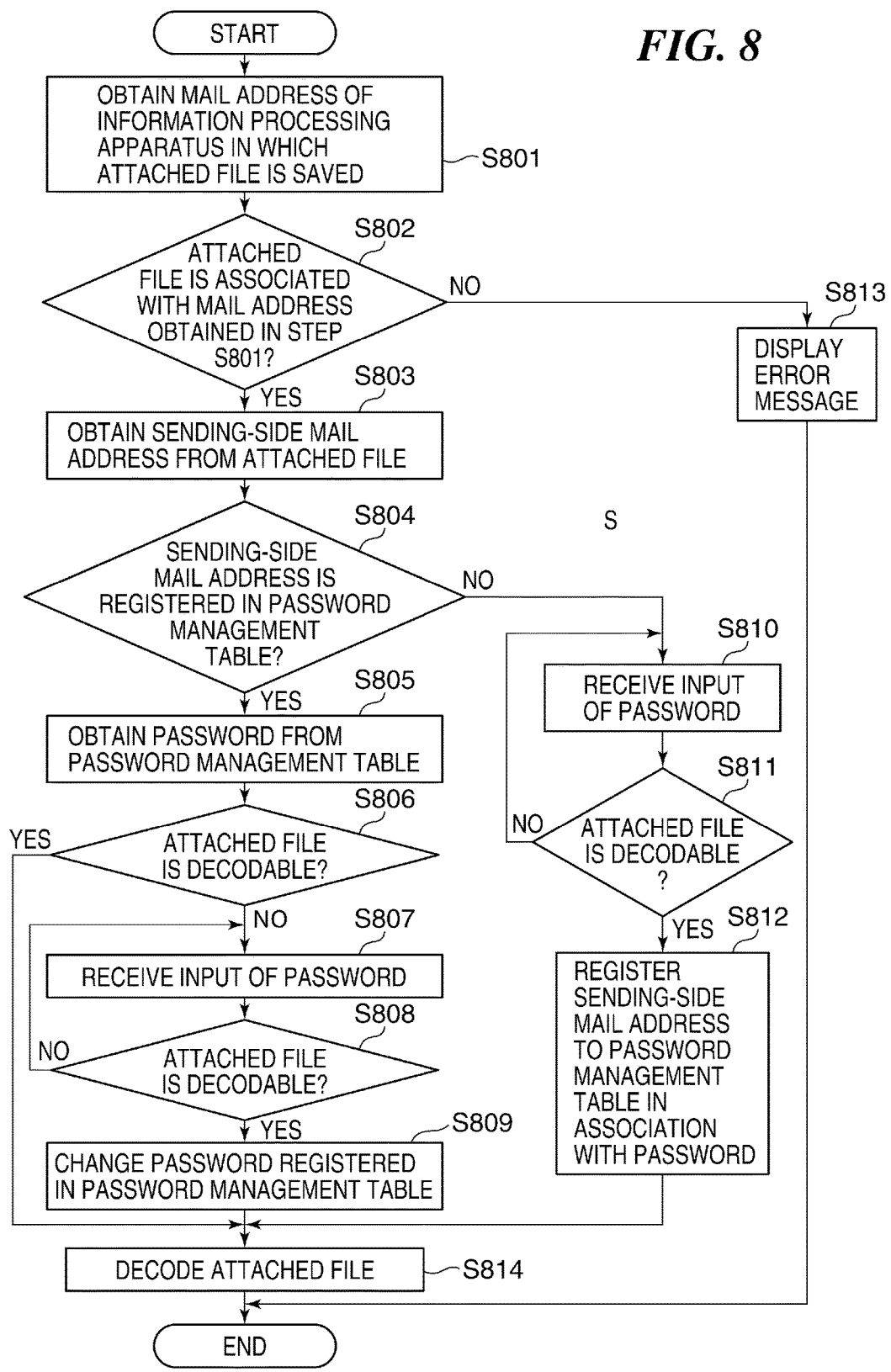
FIG. 8 is a flowchart showing a process for decoding an attached file encrypted that was saved in the information processing apparatus shown in FIG. 1B.

Incidentally, when the determination in the step S701 becomes "NO", the attached file encrypted is saved without decoding in the predetermined directory on the OS of the information processing apparatus 100R. In this case, decoding is needed when the attached file saved is opened. FIG. 8 is a flowchart showing a process for decoding an attached file encrypted that was saved on the OS of the information processing apparatus 100R. Each process shown in FIG. 8 is achieved when the CPU 106 develops the e-mail application (program) to the RAM 208, executes a predetermined arithmetic process according to the program, and controls the blocks constituting the information processing apparatus 100R. A process in step S801 is started when an icon of an attached file that was encrypted and saved in a predetermined directory is dragged and dropped to the main screen 200, for example.

In the step S801, the CPU 106 obtains the mail address set in the e-mail application of the information processing apparatus 100R (the e-mail receiving-side terminal) in which the attached file encrypted is saved. In step S802, the CPU 106 determines whether the mail address obtained in the step S801 is associated with the attached file. Specifically, it is determined whether the mail address obtained in the step S801 is included in the receiving-side mail address 503 added to the end of the attached file. When the same mail address as the mail address obtained in the step S801 is not added to the end of the attached file (NO in the step S802), the CPU 106 proceeds with the process to step S813. In the step S813, the CPU 106 displays a message showing that the attached file cannot be decoded on the display unit 101 as an example of error handling.

On the other hand, when the same mail address as the mail address obtained in the step S801 is added to the end of the attached file (YES in the step S802), the CPU 106 proceeds with the process to step S803. In the step S803, the CPU 106 obtains the sending-side mail address 502 added to the end of the attached file to be decoded. In step S804, the CPU 106 checks whether the sending-side mail address 502 obtained in the step S803 is registered in the password management table 420. When the sending-side mail address 502 is registered in the password management table 420 (YES in the step S804), the CPU 106 proceeds with the process to step S805. On the other hand, when the sending-side mail address 502 is not registered in the password management table 420 (NO in the step S804), the CPU 106 proceeds with the process to step S810.

Contents of the process in steps S805 through S812 are equivalent to the contents of the process in the steps S703 through S710 of the flowchart in FIG. 7. That is, in the step S805, the CPU 106 obtains the password associated with the sending-side mail address 502 from the password management table 420. In the following step S806, the CPU 106 determines whether the attached file is decodable with the password obtained in the step S805. When the attached file is decodable (YES in the step S806), the CPU 106 proceeds with the process to the step S814. When the attached file is not decodable (NO in the step S806), the CPU 106 proceeds with the process to step S807. In the step S807, the CPU 106 displays a password input screen and receives an input of a password to decode the attached file. It should be noted that the password input screen is the same as the password input screen described on the occasion of the description about the step S304 of the flowchart in FIG. 3. Moreover, the user of the information processing apparatus 100R needs to obtain the password that is input in the step S807 from the user of the information processing apparatus 100S by a separate e-mail, a telephone, or the like. In step S808, the CPU 106 determines whether the attached file is decodable with the password input in the step S807. When the attached file is decodable (YES in the step S808), the CPU 106 proceeds with the process to the step S809. When the attached file is not decodable (NO in the step S808), the CPU 106 returns the process to the step S807. In the step S809, the CPU 106 updates the password management table 420 by changing the registered password associated with the sending-side mail address to the password that was input in the step S807. The CPU 106 proceeds with the process to the step S814 after executing the process in the step S809.

In the step S810, the CPU 106 displays a password input screen and receives an input of a password to decode the attached file. It should be noted that the password input screen is the same as the password input screen described on the occasion of the description about the step S304 of the flowchart in FIG. 3. Moreover, the user of the information processing apparatus 100R needs to obtain the password that is input in the step S810 from the user of the information processing apparatus 100S by a separate e-mail, a telephone, or the like. In step S811, the CPU 106 determines whether the attached file is decodable with the password input in the step S810. When the attached file is decodable (YES in the step S811), the CPU 106 proceeds with the process to the step S812. When the attached file is not decodable (NO in the step S811), the CPU 106 returns the process to the step S810. In the step S812, the CPU 106 registers the sending-side mail address 502 that was obtained in the step S803 in association with the password input in the step S810 to the password management table 420. The CPU 106 proceeds with the process to the step S814 after executing the process in the step S812.

In the step S814, the CPU 106 decodes the attached file with the password specified in the step S805, S807, or S810. When the process in the step S813 or S814 is finished, this process is finished.

As mentioned above, the process according to the flowchart in FIG. 8 manages the sending-side terminal and receiving-side terminal of an e-mail including an attached file encrypted by means of the attached file encrypted. That is, the receiving-side terminal of an e-mail including an attached file encrypted manages a password by means of the attached file encrypted, which is saved on the OS, after receipt. This reduces labor for inputting a password when an attached file encrypted is decoded (i.e., a password is not always required to input), and improves the security while the attached file is saved. It should be noted that the processes in the steps S801 and S802 may be omitted. In such a case, the receiving-side mail address 503 may not be added to the end of the attached file.

Figure 9A:
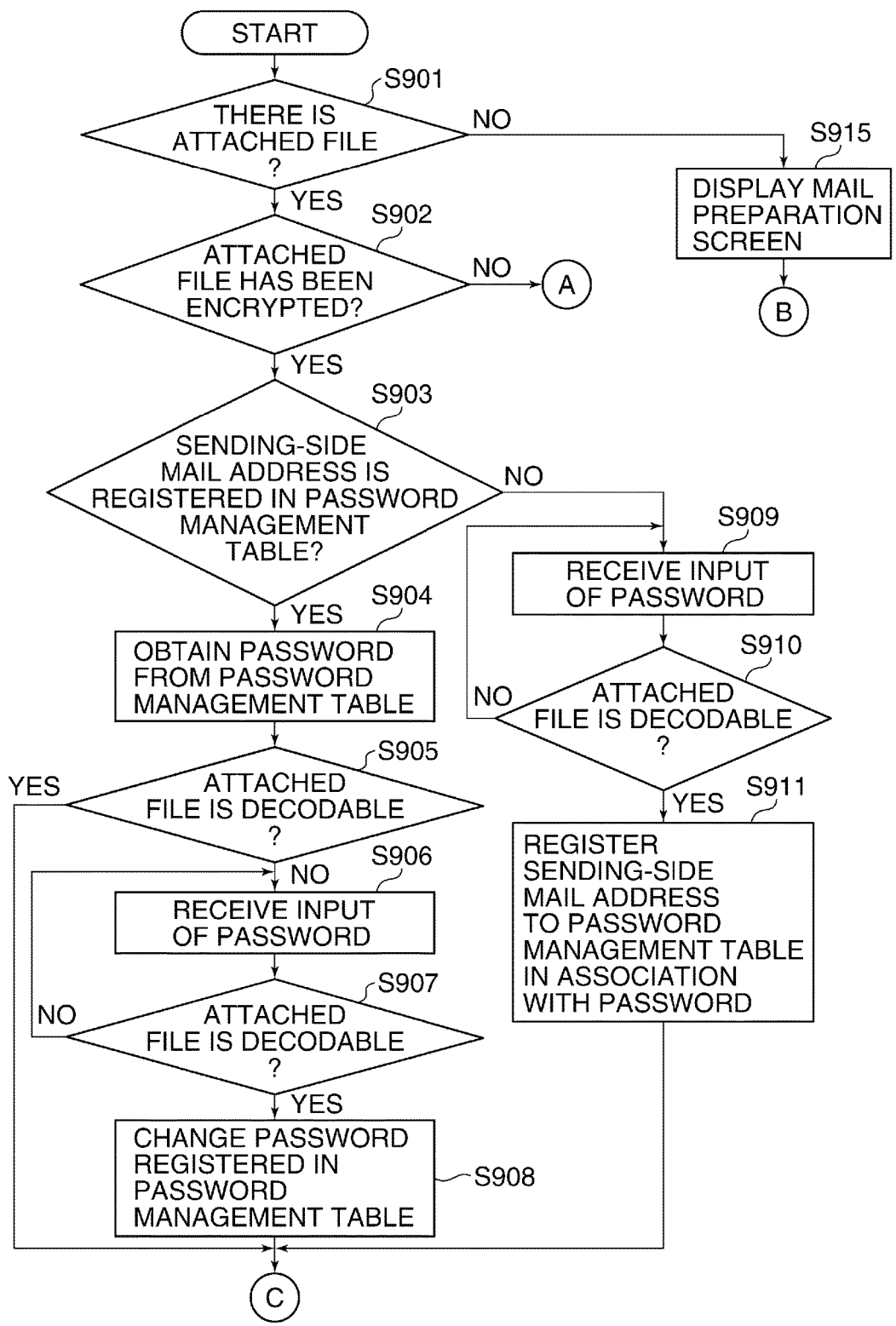
FIG. 9A and FIG. 9B are flowcharts showing an attached file transfer process executed by the information processing apparatus shown in FIG. 1B when a transfer button is pressed in the main screen in FIG. 2A.
Figure 9B:
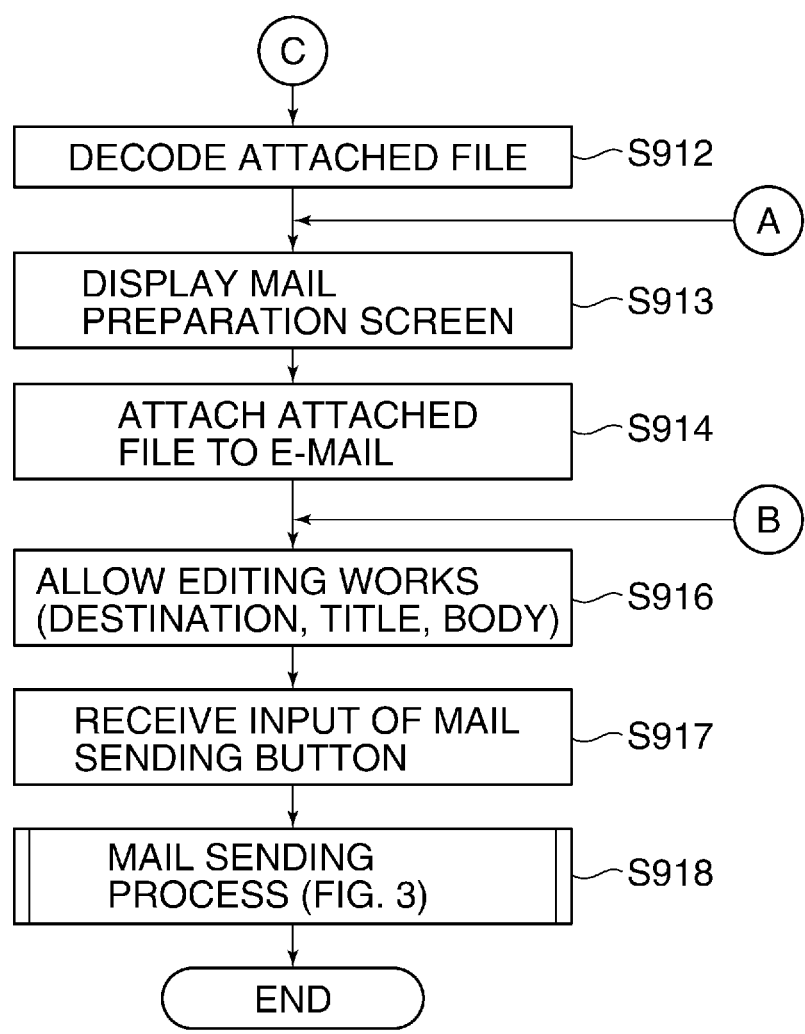

Next, a process executed by the information processing apparatus 100R when the user of the information processing apparatus 100R who received an e-mail including an attached file transfers the received e-mail to a third party will be described. FIG. 9A and FIG. 9B are flowcharts showing an attached-file transfer process executed by the information processing apparatus 100R when the transfer button 202 in the main screen 200 is pressed. Each process shown in FIG. 9A and FIG. 9B is achieved when the CPU 106 develops the e-mail application (program) to the RAM 208, executes a predetermined arithmetic process according to the program, and controls the blocks constituting the information processing apparatus 100R.

In step S901, the CPU 106 checks whether an e-mail that is subjected to transfer includes an attached file. When there is no attached file (NO in the step S901), the CPU 106 proceeds with the process to step S915, opens the mail preparation screen 250 (see FIG. 2B) in the step S915, and proceeds with the process to step S916 after that.

When there is an attached file (YES in the step S901), the CPU 106 proceeds with the process to step S902. In the step S302, the CPU 106 checks whether the attached file of the e-mail that is subjected to transfer has been encrypted. When the attached file has been encrypted (YES in the step S902), the CPU 106 proceeds with the process to the step S903. When the attached file has not been encrypted (NO in the step S902), the CPU 106 proceeds with the process to step S913. In the step S903, the CPU 106 checks whether the sending-side mail address of the e-mail that is subjected to transfer is registered in the password management table 420. When the sending-side mail address is registered in the password management table 420 (YES in the step S903), the CPU 106 proceeds with the process to step S904. When the sending-side mail address is not registered in the password management table 420 (NO in the step S903), the CPU 106 proceeds with the process to step S909.

Contents in steps S904 through S911 are equivalent to the contents of the process in the steps S703 through S710 of the flowchart in FIG. 7. That is, since the CPU 106 obtains the password associated with the sending-side mail address of the e-mail that is subjected to transfer from the password management table 420 in the step S904. In the following step S905, the CPU 106 determines whether the attached file is decodable with the password obtained in the step S904. When the attached file is decodable (YES in the step S905), the CPU 106 proceeds with the process to the step S912. When the attached file is not decodable (NO in the step S905), the CPU 106 proceeds with the process to step S906.

In the step S906, the CPU 106 displays a password input screen and receives an input of a password to decode the attached file. It should be noted that the password input screen is the same as the password input screen described on the occasion of the description about the step S304 of the flowchart in FIG. 3. Moreover, the user of the information processing apparatus 100R needs to obtain the password that is input in the step S906 from the user of the information processing apparatus 100S by a separate e-mail, a telephone, or the like. In step S907, the CPU 106 determines whether the attached file is decodable with the password input in the step S906. When the attached file is decodable (YES in the step S907), the CPU 106 proceeds with the process to the step S908. When the attached file is not decodable (NO in the step S907), the CPU 106 returns the process to the step S906. In the step S908, the CPU 106 updates the password management table 420 by changing the registered password associated with the sending-side mail address to the password that was input in the step S906. The CPU 106 proceeds with the process to the step S912 after executing the process in the step S907.

In the step S909, the CPU 106 displays a password input screen and receives an input of a password to decode the attached file. It should be noted that the password input screen is the same as the password input screen described on the occasion of the description about the step S304 of the flowchart in FIG. 3. Moreover, the user of the information processing apparatus 100R needs to obtain the password that is input in the step S909 from the user of the information processing apparatus 100S by a separate e-mail, a telephone, or the like. In step S910, the CPU 106 determines whether the attached file is decodable with the password input in the step S909. When the attached file is decodable (YES in the step S910), the CPU 106 proceeds with the process to the step S911. When the attached file is not decodable (NO in the step S910), the CPU 106 returns the process to the step S909. In the step S911, the CPU 106 obtains the sending-side mail address of the e-mail that is subjected to transfer, and registers it in association with the password input in the step S909 to the password management table 420. The CPU 106 proceeds with the process to the step S912 after executing the process in the step S911.

In the step S912, the CPU 106 decodes the attached file of the e-mail that is subjected to transfer with the password specified in the step S904, S906, or S909. In step S913, the CPU 106 displays the mail preparation screen 250 on the display unit 101. In step S914, the CPU 106 presents the file name of the attached file that was decoded in the step S912 or the attached file that is not encrypted and is included in the e-mail subjected to transfer in the attached file display column 256 of the mail preparation screen 250. In step S916 following the steps S914 and S915, the CPU 106 allows editing works, such as inputs to the destination input column 253, the title input column 254, and the body input column 255 in the mail preparation screen 250. In step S917, the CPU 106 receives a press of the sending button 251 in the mail preparation screen 250.

In step S918, the CPU 106 performs the e-mail sending process that was described with reference to the flowchart in FIG. 3. It should be noted that the information processing apparatus 100R has a password management table associating a mail address and password of a destination that is similar to the password management table 400 in order to enable execution of the process in the step S918. Since the transfer process is one of the sending processes, the information processing apparatus 100R is able to use the password management table 400 for the transfer process. Then, the CPU 106 obtains the password associated with the destination mail address, encrypts the attached file again so as to be decodable with the obtained password, and sends the e-mail including the attached file. Then, this process is finished.

As mentioned above, an attached file is encrypted so as to be decodable with a password associated with a destination mail address according to the process of the flowcharts in FIG. 9A and FIG. 9B. Accordingly, security of an attached file at the time of transferring an e-mail is securable, and labor that a user decodes an attached file at the time of receiving an e-mail and labor that the user encrypts the attached file at the time of transferring the e-mail are reduced. Moreover, security of an attached file is securable after receiving an e-mail including the attached file until the attached file is transferred with an e-mail. It should be noted that the receiving-side terminal of the transferred e-mail decodes the attached file by the process according to the flowchart in FIG. 7 or FIG. 8.

Although the embodiments of the invention have been described, the present invention is not limited to the above-mentioned embodiments, the present invention includes various modifications as long as the concept of the invention is not deviated. For example, the e-mail sending process was described in the case where the information processing apparatus of the e-mail sending side adds a sending-side mail address and receiving-side mail address to the attached file encrypted with the password. However, the present invention is not limited to the above case. The information processing apparatus of the receiving side may add a sending-side mail address and receiving-side mail address to an attached file when saving the attached file. This enables execution of the process described with reference to the flowchart in FIG. 8. Moreover, only a sending-side mail address may be added to an attached file encrypted with a password without adding a receiving-side mail address. This also enables execution of the process of the flowchart in FIG. 8 (excluding the process in the steps S801 and S802). Furthermore, a sending-side mail address and receiving-side mail address may not be added to an attached file to an e-mail encrypted with a password. For example, a sending-side mail address and receiving-side mail address may be sent and received as other information that is associated with the attached file and is attached to the e-mail together with the attached file.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-052247, filed Mar. 16, 2016, which is hereby incorporated by reference herein in its entirety.

What is claimed is:

1. An e-mail sending-receiving system comprising:
an e-mail sending-side terminal comprising:
  a first processor; and
  a memory storing a program which, when executed by the first processor, causes the e-mail sending-side terminal to:
    store a password in a storage medium in association with a receiving-side mail address;
    encrypt a file attached to an e-mail such that the encrypted file is decrypted using the password that is stored in association with the receiving-side mail address of the e-mail;
    generate the e-mail by attaching the encrypted file; and
    send the generated e-mail to the receiving-side mail address; and
an e-mail receiving-side terminal comprising:
  a second processor; and
  a memory storing a program which, when executed by the second processor, causes the e-mail receiving-side terminal to:
    store the password in a storage medium in association with a sending-side mail address;
    receive the e-mail;
    decrypt the encrypted file attached to the e-mail using the password stored in association with the sending-side mail address of the received e-mail; and
    save the encrypted file or the decrypted file into an area selected by a user,
  wherein the encrypted file is saved in association with the receiving-side mail address of the received e-mail and the sending-side mail address of the received e-mail, into the area; and
  wherein the saved encrypted file is decrypted by obtaining the sending-side mail address associated with the saved encrypted file and obtaining the password stored in association with the obtained sending-side mail address for decrypting the saved encrypted file.

2. The e-mail sending-receiving system according to claim 1, wherein the file is encrypted such that each encrypted file is decrypted with respective passwords stored in association with respective receiving-side mail addresses, when the plurality of receiving-side mail addresses are set to the e-mail, and
  wherein a plurality of e-mails are generated for the respective receiving-side mail addresses by attaching the respective files encrypted such that each encrypted file is decrypted with the respective passwords stored in association with the plurality of receiving-side mail addresses.

3. An information processing apparatus comprising:
a processor; and
a memory storing a program which, when executed by the processor, causes the e-mail receiving-side terminal to:
store a first password in a storage medium in association with a sending-side mail address;
receive an e-mail to which an encrypted file is attached; and
decrypt the encrypted file attached to the e-mail using the first password stored in association with the sending-side mail address of the received e-mail; and
save the encrypted file or the decrypted file into an area selected by a user,
wherein the first password is stored in association with a receiving-side mail address of the e-mail by another information processing apparatus that sends the received e-mail,
wherein the encrypted file is encrypted by the other information processing apparatus such that each encrypted file is decrypted using the first password, and
wherein the encrypted file is saved in association with the receiving-side mail address of the received e-mail and the sending-side mail address of the received e-mail, into the area; and
wherein the saved encrypted file is decrypted by obtaining the sending-side mail address associated with the saved encrypted file and obtaining the first password stored in association with the obtained sending-side mail address for decrypting the saved encrypted file.

4. The information processing apparatus according to claim 3, wherein the program when executed by the processor further causes the information processing apparatus to:
store a second password in a storage medium in association with a receiving-side mail address;
encrypt the file decrypted using the first password such that each encrypted file is decrypted using the second password that is stored in association with the receiving-side mail address;
generate the e-mail by attaching the encrypted file; and
send the generated e-mail to the receiving-side mail address.

5. A control method for an e-mail sending-receiving system, the control method comprising:
storing a password in a storage medium in association with a receiving-side mail address;
storing the password in the storage medium in association with a sending-side mail address
encrypting a file attached to an e-mail such that the encrypted file is decrypted using the password that is stored in association with the receiving-side mail address of the e-mail;
generating the e-mail by attaching the encrypted file;
sending the generated e-mail to the receiving-side mail address;
receiving the e-mail;
decrypting the encrypted file attached to the e-mail using the password stored in association with the sending-side mail address of the received e-mail;
saving the encrypted file or the decrypted file into an area selected by a user,
wherein the encrypted file is saved in association with the receiving-side mail address of the received e-mail and the sending-side mail address of the received e-mail, into the area; and
wherein the saved encrypted file is decrypted by obtaining the sending-side mail address associated with the saved encrypted file and obtaining the password stored in association with the obtained sending side mail address for decrypting the saved encrypted file.

6. A control method for an information processing apparatus, the control method comprising:
storing a first password in a storage medium in association with a sending-side mail address;
receiving an e-mail to which an encrypted file is attached;
decrypting the encrypted file attached to the e-mail using the first password that is stored in association with the sending-side mail address of the received e-mail; and
saving the encrypted file or the decrypted file into an area selected by a user,
wherein the first password is stored in association with a receiving-side mail address of the e-mail by another information processing apparatus that sends the received e-mail,
wherein the encrypted file is encrypted by the other information processing apparatus such that the encrypted file is decrypted using the first password,
wherein the encrypted file is saved in association with the receiving-side mail address of the received e-mail and the sending-side mail address of the received e-mail, into the area, and
wherein the saved encrypted file is decrypted by obtaining the sending-side mail address associated with the saved encrypted file and obtaining the first password stored in association with the obtained sending-side mail address for decrypting the saved encrypted file.

7. A non-transitory computer-readable storage medium storing a control program causing a computer to execute a control method for an image processing apparatus, the control method comprising:
storing a first password in a storage medium in association with a sending-side mail address;
receiving an e-mail to which an encrypted file is attached;
decrypting the encrypted file attached to the e-mail using the first password that is stored in association with the sending-side mail address of the received e-mail; and
saving the encrypted file or the decrypted file into a area selected by a user,
wherein the first password is stored in association with a receiving-side mail address of the e-mail by another information processing apparatus that sends the received e-mail,
wherein the encrypted file is encrypted by the other information processing apparatus such that the encrypted file is decrypted using the first password,
wherein the encrypted file is saved in association with the receiving-side mail address of the received e-mail and the sending-side mail address of the received e-mail, into the area; and
wherein the saved encrypted file is decrypted by obtaining the sending-side mail address associated with the saved encrypted file and obtaining the first password stored in association with the obtained sending-side mail address for decrypting the saved encrypted file.

* * * * *